US011827654B2

(12) United States Patent
Balasanthiran et al.

(10) Patent No.: US 11,827,654 B2
(45) Date of Patent: Nov. 28, 2023

(54) ORGANOMETALLIC COMPOUNDS AND PROCESSES FOR PREPARING SAME

(71) Applicant: ENTEGRIS, INC., Billerica, MA (US)

(72) Inventors: Vagulejan Balasanthiran, Pennsburg, PA (US); Scott A. Laneman, Vernon Hills, IL (US)

(73) Assignee: ENTEGRIS, INC., Billerica, MA (US)

( * ) Notice: Subject to any disclaimer, the term of this patent is extended or adjusted under 35 U.S.C. 154(b) by 0 days.

(21) Appl. No.: 17/987,642

(22) Filed: Nov. 15, 2022

(65) Prior Publication Data

US 2023/0167146 A1    Jun. 1, 2023

Related U.S. Application Data

(60) Provisional application No. 63/283,876, filed on Nov. 29, 2021.

(51) Int. Cl.
*C07F 17/00* (2006.01)
*C07F 7/00* (2006.01)

(52) U.S. Cl.
CPC ...................... *C07F 7/00* (2013.01)

(58) Field of Classification Search
CPC ................. C07F 17/00; C07F 11/00
See application file for complete search history.

(56) References Cited

U.S. PATENT DOCUMENTS

| 4,882,206 | A | | 11/1989 | Erbil | |
|---|---|---|---|---|---|
| 4,992,305 | A | | 2/1991 | Erbil | |
| 5,012,022 | A | | 4/1991 | Venier | |
| 6,090,992 | A | * | 7/2000 | Wu | B01J 23/20 502/224 |
| 6,175,027 | B1 | | 1/2001 | Sullivan et al. | |
| 7,579,415 | B2 | | 8/2009 | Agapiou et al. | |
| 7,834,228 | B1 | | 11/2010 | Voll Barclay et al. | |
| 9,109,281 | B2 | * | 8/2015 | Gatineau | C01G 25/02 |
| 2002/0032288 | A1 | | 3/2002 | Tanaka | |
| 2006/0068103 | A1 | * | 3/2006 | Machida | C23C 16/18 427/248.1 |
| 2008/0287725 | A1 | | 11/2008 | Martin | |
| 2012/0308739 | A1 | * | 12/2012 | Lansalot-Matras | C23C 16/30 427/255.39 |
| 2013/0085289 | A1 | | 4/2013 | Harlan et al. | |
| 2018/0087164 | A1 | * | 3/2018 | Finke | C25B 1/04 |
| 2018/0166276 | A1 | | 6/2018 | Nakao | |
| 2022/0098734 | A1 | * | 3/2022 | Elam | C23C 16/22 |
| 2023/0167136 | A1 | * | 6/2023 | Balasanthiran | C07C 13/61 585/23 |

OTHER PUBLICATIONS

M. Green et al. Journal of the Chemical Society (Resumed), 4854-4859 (1961) (Year: 1961).*
A. Tumanov et al., 263 Journal of Organometallic Chemistry, 213-224 (1984) (Year: 1984).*
Written Opinion of the International Searching Authority in PCT/US2022/049977 (dated Mar. 14, 2023) (Year: 2023).*
M. Green et al., Journal of the Chemical Society, 4854-4859 (1961) (Year: 1961).*
N. Perevozchikova et al., 4 Khimiya Elementoorganicheskikh Soedinenii, 95-97 (1976) (Year: 1976).*
A. Ogura et al., 26 Journal of Vacuum Science & Technology A (2008) (Year: 2008).*
A Correia et al., 201 Surface & Coatings Technology, 9120-9124 (2007) (Year: 2007).*
Anacleto et al., Novel cyclopentadienyl based precursors for CVD of W containing films, Surface & Coatings Technology 201, pp. 9120-9124, 2007.
Ogura et al., W chemical-vapor deposition using (i-C3H7C5H4)2WH2, Journal of vacuum science & technology A, American Vacuum Society, vol. 26., No. 4., pp. 561-564, 2008.
Tumanov et al., Intermolecular interaction of bis(alkylcyclopentadienyl)tungsten dihalogenides with tetracyanoethylene and tetracyanoquinodimethane studied by UV absorption spectroscopy, Journal of Organometallic Chemistry, vol. 263, pp. 213-224, 1984.
Green et al., The Di-v-cyclopentadienyl Hydrides of 955. The di-π-cyclopentadienyl hydrides of tantalum, molybdenum, and tungsten, Journal of the Chemical Society, pp. 4854-4859, 1961.
Levet, Gaspard et al., Preparation of a Key Tetraene Precursor for the Synthesis of Long Acenes, Eur. J. Org. Chem. 2020, 1658-1664 (https://chemistry-europe.onlinelibrary.wiley.com/doi/10.1002/ejoc.201901868).
Paradies, Jan et al., Frustrated Lewis pair catalyzed hydrosilylation and hydrosilane mediated hydrogenation of fulvenes, Org. Biomol. Chem., 2014, 12, 9139.
Perevozchikova et al., Dihydrides of bis-isopropylcyclopentadienyl-tungsten and -molybdenum, Khimiya Elementoorganicheskikh Soedinenii (1976), 4, 95-7.
Stone, Keith J. et al., An exceptionally simple and efficient method for the preparation of a wide variety of fulvenes, J. Org. Chem. 1984, 49, 11, 1849-1853 (https://doi.org/10.1021/jo00185a001).
Walter et al., American Chemical Society, Organometallics, Spin Equilibria in Monomeric Manganocenes: Solid-State Magnetic and EXAFS Studies, vol. 28, No. 7, pp. 2005-2019, 2009.

(Continued)

*Primary Examiner* — Alexander R Pagano

(57) ABSTRACT

The disclosure provides a process for preparing bis(monoalkyl-substituted cyclopentadiene) tungsten hydride compounds, for example bis(isopropylcyclopentadienyl)tungsten dihydride, via the corresponding magnesium compound and tungsten hexachloride, followed by treatment with a hydride reagent. Also provided is a process for preparing bis(monoalkyl-substituted cyclopentadiene) metal halide compounds. This latter aspect is achieved by reaction of the corresponding magnesium compound with a metal halide. Exemplary metals in this process include hafnium, zirconium, titanium, tantalum, niobium, tungsten, and molybdenum.

17 Claims, No Drawings

(56) References Cited

OTHER PUBLICATIONS

Westerhausen et al., European Journal of Inorganic Chemistry, Substituted Cyclopentadienides of Magnesium from the Reaction of Dialkyl Magnesium with Fulvenes, pp. 965-971, 1998.

* cited by examiner

ORGANOMETALLIC COMPOUNDS AND PROCESSES FOR PREPARING SAME

CROSS-REFERENCE TO RELATED APPLICATIONS

This application claims the benefit under 35 USC 119 of U.S. Provisional Patent Application No. 63/283,276, filed Nov. 29, 2021, the disclosure of which is hereby incorporated herein by reference in its entirety.

TECHNICAL FIELD

The disclosure relates generally to processes for preparing monoalkyl cyclopentadiene compounds coordinated to various metals.

BACKGROUND

Many organometallic compounds are utilized in the manufacturing of microelectronic devices. For example, U.S. Patent Publication No. 2018/0166276 describes the deposition of a mask layer containing one or more metals including tungsten, tantalum, zirconium, hafnium, molybdenum, niobium, ruthenium, osmium, rhenium, and iridium using various metal precursors. In particular, bis(isopropylcyclo-pentadienyl)tungsten dihydride (CAS No. 64561-25-7) is listed as useful in atomic layer deposition of such mask layers.

One inherent difficulty in the handling of cyclopentadiene is that it tends to dimerize via a Diels-Alder reaction. This dimerization proceeds at room temperature over a period of hours, but can be reversed by utilization of heating, which in some cases requires a cracking procedure. Additionally, in alkylation reactions utilizing a cyclopentadiene anion species, the formation of di- and tri-alkyl species can be encountered, which further complicates the synthetic regime by reducing yields and necessitating further separation and purification.

Thus, improved methodology for the preparation of such compounds, is desirable.

SUMMARY

In summary, the disclosure provides a process for preparing bis(monoalkyl-substituted cyclopentadiene) tungsten hydride compounds, for example bis(isopropylcyclo-pentadienyl)tungsten dihydride, via the corresponding magnesium compound and tungsten hexachloride, followed by treatment with a hydride reagent. Bis(isopropylcyclo-pentadienyl)tungsten dihydride (CAS No. 64561-25-7) is useful in atomic layer deposition (See, for example, U.S. Patent Publication No. 2018/0166276.)

In another aspect, the disclosure provides a process for preparing bis(monoalkyl-substituted cyclopentadiene) metal halide compounds. This latter aspect is achieved by reaction of the corresponding magnesium compound with a metal halide. Exemplary metals in this process include hafnium, zirconium, titanium, tantalum, niobium, and molybdenum.

DETAILED DESCRIPTION

As used in this specification and the appended claims, the singular forms "a", "an", and "the" include plural referents unless the content clearly dictates otherwise. As used in this specification and the appended claims, the term "or" is generally employed in its sense including "and/or" unless the content clearly dictates otherwise.

The term "about" generally refers to a range of numbers that is considered equivalent to the recited value (e.g., having the same function or result). In many instances, the term "about" may include numbers that are rounded to the nearest significant figure.

Numerical ranges expressed using endpoints include all numbers subsumed within that range (e.g., 1 to 5 includes 1, 1.5, 2, 2.75, 3, 3.80, 4 and 5).

In a first aspect, the disclosure provides a process for preparing a compound of the Formula (I)

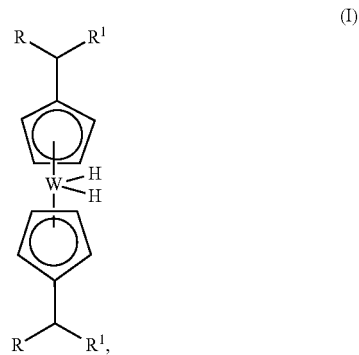

wherein R and $R^1$ are independently chosen from hydrogen and $C_1$-$C_8$ alkyl;
which comprises contacting a compound of the formula

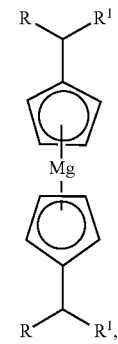

with $WCl_6$, followed by treatment with (e.g., adding) a hydride reagent.

In the above process, suitable hydride reagents include, but are not limited to $NaBH_4$, $LiBH_4$, $LiAlH_4$, $LiBH(CH_3CH_2)_3$, [$(isobutyl)_2AlBH_4$], $NaBH_3CN$, $Na[HB(OC(O)CH_3)]$, B $H_3$-tetrahydrofuran, $BH_3$—$S(CH_3)_2$, diisobutylaluminum hydride (also known as DIBAL), and sodium bis(2-methoxyethoxy)aluminium hydride ($NaAlH_2(OCH_2CH_2OCH_3)_2$. In one embodiment, the hydride reagent is $NaBH_4$.

The process of the disclosure thus provides facile methodology for preparing bis(mono-alkyl) cyclopentadiene tungsten compounds, which are useful as tungsten-containing precursors in the preparation of tungsten oxide and sulfide films via atomic layer deposition. In one embodiment, R and $R^1$ are methyl, i.e., the monoalkyl substituent on the cyclopentadiene rings is isopropyl. In other embodiments, R and $R^1$ are chosen from hydrogen, methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, and sec-octyl.

The bis(monoalkyl-substituted cyclopentadiene) magnesium compound above can be prepared by reacting a corresponding fulvene compound with a dialkyl magnesium compound. Accordingly, in another aspect, the disclosure provides a process for preparing a compound of the Formula (I):

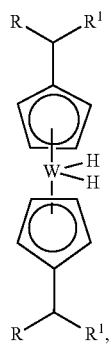

wherein R and $R^1$ are independently chosen from hydrogen and $C_1$-$C_8$ alkyl;

which comprises contacting a compound of the formula

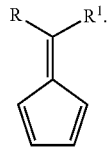

with a dialkyl magnesium compound to provide a compound of the formula

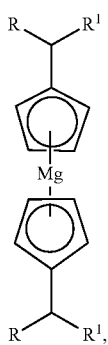

followed by treatment with (e.g., adding) a compound of the formula $WCl_6$, followed by treatment with (e.g., adding) a hydride reagent.

In this process, suitable dialkyl magnesium compounds include those having alkyl groups capable of β-hydride elimination; examples include $Mg(C_2$-$C_8$ alkyl$)_2$, $Mg(C_3$-$C_8$ alkyl$)_2$, or $Mg(C_4$-$C_8$ alkyl$)_2$. In one embodiment, the dialkyl magnesium compound is chosen from $Mg(CH_2CH_2CH_2CH_3)_2$ and $Mg[(CH)(CH_3)(CH_2CH_3)][CH_2CH_2CH_2CH_3]$.

The fulvene starting materials of the formula

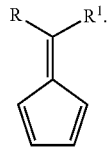

can be prepared by reacting the corresponding a ketone or aldehyde of the formula $R^1$—C(O)—$R^2$ and cyclopentadiene in the presence of a base such as pyrrolidone or an alkali metal hydroxide.

As noted above, the compounds of Formula (I) are useful as precursors in atomic layer deposition onto microelectronic device substrates. See, for example, US Patent Publication No. 2018/0166276, and in particular bis(isopropylcyclopentadienyl)tungsten dihydride (CAS No. 64561-25-7). Advantageously, the compounds of Formula (I) are thus provided substantially devoid of undesired contaminants such as lithium and bis(alkylated) metallocenes.

In a further aspect, the disclosure provides a process for preparing a compound of the Formula (II):

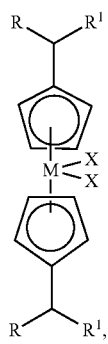

wherein M is chosen from Hf, Zr, Ti, Ta, Nb, W, and Mo; and wherein R and $R^1$ are independently chosen from hydrogen and $C_1$-$C_8$ alkyl;

which comprises contacting a compound of the formula

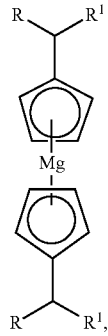

with a compound of the formula $MX_4$, wherein X is chosen from chloro, bromo, and iodo.

In this aspect, a variety of organometallic compounds of Formula (II) can be prepared, utilizing the bis(monoalkylcyclopentadiene)magnesium compounds above as starting materials and thus provided by reaction with the corresponding metal tetrahalide, e.g., HfCl$_4$. The compounds of Formula (II) are use full in polyolefin catalysis, such as polyethylene and polypropylene.

In one embodiment, M is Hf, Zr, Ti, or Mo.

In one embodiment, R and R$^1$ are methyl, i.e., thus depicting an isopropyl group. In other embodiments, R and R$^1$ are hydrogen, methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, and sec-octyl.

In the disclosure, the processes which begin with a substituted fulvene starting material thus enable the synthesis of exclusively monoalkyl-substituted compounds of Formulae (I) and (II) versus formation of multi-alkylated cyclopentadienyl species, which can occur in ordinary alkylation reaction approaches where the product can become deprotonated by the initial metal-Cp complex (i.e., anionic cyclopentadiene) prior to a second alkylation with, for example alkyl bromide. In the latter case, levels of multi-alkylation can range from 0.5-5 weight percent. Advantageously, the processes of the disclosure provide mono-alkylated species with no detectible levels of multi-alkylated species by gas chromatography (e.g., GC and GC-MS) or NMR. Thus, in a further embodiment, the processes of the disclosure provide products having less than 0.5 weight percent, less than 0.3, or less than 0.1 weight percent of multi-alkylated species, as determined by gas chromatography.

Additionally, given the substituted fulvene approach outlined herein, the disclosure further advantageously provides the products of Formulae (I) and (II), devoid of dicyclopentadiene and mixed dicyclopentadiene species.

EXAMPLE

Synthetic procedure for the preparation ($^i$PrCp)$_2$WH$_2$ using ($^i$PrCp)$_2$Mg Under inert conditions WCl$_6$ (2.00 g, 5 mmol) was charged in a 250 mL Schlenk flask containing magnetic. Hexane (10 mL) and DME (20 mL) were added to the flask, and the reaction mixture cooled to 0-5° C. with stirring. ($^i$PrCp)$_2$Mg (2.41 g, 10 mmol) was added, and the resulting mixture was stirred for 30 minutes. THF (20 mL) was charged while maintaining 0-5° C. temperatures. NaBH$_4$ (0.51 g, 13.4 mmol) was added under nitrogen, which produced a slight exotherm (+3° C.). The reaction mixture turned to pale yellow from brown. The reaction mixture was slowly warm to room temperature over 1.5 hours. The reaction mixture became pale yellow in color. The reaction mixture was heated to 50-55° C. for 2 hours then cooled to ~30° C. All solvents were removed under vacuum. Hexane (50 mL) was added to the flask, and the mixture is cooled to 0° C. DI water (50 mL) was added slowly with stirring, and an +2° C. exotherm was observed. After 15 min stirring, water layer was discarded. The reaction flask cooled to 0° C. and 30% aqueous acetic acid (20 mL) added with stirring. After 15 minutes stirring, the aqueous layer was separated, and the organic layer was discarded. Hexane (50 mL) was added to aqueous layer and cooled to 0° C. The aqueous layer was neutralized with 50% NaOH solution. The organic layer was separated, and all the volatiles were removed with vacuum to produce a 1.8 g of brown viscous liquid with 83% yield. NMR data is below. $^1$H-NMR (C$_6$D$_6$, δ-ppm): 4.18 (d, 4H, CpH), 2.42 (m, 2H, CH(CH$_3$)$_2$), 1.1 (d, 6H, CH(CH$_3$)$_2$), and −11.85 (s, 2H, W—H).

In a first aspect, the disclosure provides a process for preparing a compound of the Formula (I):

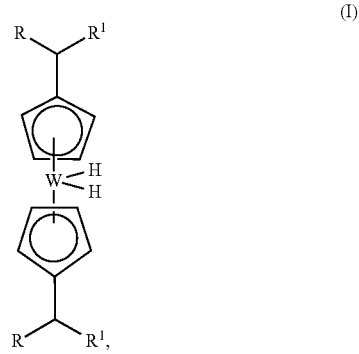

wherein R and R$^1$ are independently chosen from hydrogen and C$_1$-C$_8$ alkyl;
which comprises contacting a compound of the formula

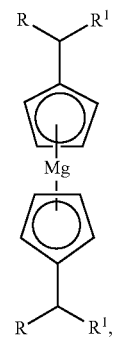

with WCl$_6$ and adding a hydride reagent.

In a second aspect, the disclosure provides the process of the first aspect, wherein the hydride reagent is NaBH$_4$, LiAlH$_4$, LiBH$_4$, LiBH(CH$_3$CH$_2$)$_3$, [(isobutyl)$_2$AlBH$_4$], NaBH$_3$CN, Na[HB(O(O)CH$_3$)], BH$_3$-tetrahydrofuran, BH$_3$—S(CH$_3$)$_2$, diisobutylaluminum hydride, or sodium bis (2-methoxyethoxy)aluminium hydride.

In a third aspect, the disclosure provides the process of the first or second aspect, wherein R and R$^1$ are hydrogen, methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, or sec-octyl.

In a fourth aspect, the disclosure provides the process of the first, second, or third aspect, wherein R and R$^1$ are methyl.

In a fifth aspect, the disclosure provides the process of any one of the first through the fourth aspects, wherein the hydride reagent is NaBH$_4$.

In an sixth aspect, the disclosure provides the process of any one of the first through the fifth aspects, wherein the compound of Formula (I) has less than about 0.5 weight percent, less than about 0.3 weight percent, or less than about 0.1 weight percent of multi-alkylated species.

In a seventh aspect, the disclosure provides the process of any one of the first through the eighth aspects, wherein the compound of Formula (I) is devoid of dicyclopentadiene and mixed cyclopentadiene species.

In an eighth aspect, the disclosure provides a compound of the Formula (I):

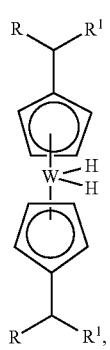
(I)

wherein R and R¹ are independently chosen from hydrogen and $C_1$-$C_8$ alkyl, and wherein the compound of Formula (I) has less than about 0.5 weight percent of multi-alkylated species, as determined by gas chromatography.

In a ninth aspect, the disclosure provides the compound of the eighth aspect, wherein the compound of Formula (I) has less than about 0.3 weight percent or less than about 0.1 weight percent of multi-alkylated species, as determined by gas chromatography.

In a tenth aspect, the disclosure provides the compound of the ninth or tenth aspect, wherein the compound of Formula (I) is further devoid of dicyclopentadiene and mixed dicyclopentadiene species.

In an eleventh aspect, the disclosure provides a process for preparing a compound of the Formula (I):

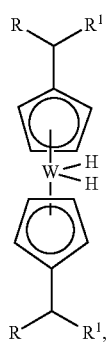
(I)

wherein R and R¹ are independently chosen from hydrogen and $C_1$-$C_8$ alkyl;

which comprises contacting a compound of the formula

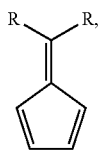

with a dialkyl magnesium compound to provide a compound of the formula

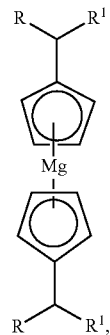

Adding $WCl_6$, and adding a hydride reagent.

In a twelfth aspect, the disclosure provides the process of the eleventh aspect, wherein the hydride reagent is $NaBH_4$, $LiAlH_4$, $LiBH_4$, $LiBH(CH_3CH_2)_3$, $[(isobutyl)_2AlBH_4]$, $NaBH_3CN$, $Na[HB(OC(O)CH_3)]$, $BH_3$-tetrahydrofuran, $BH_3$—$S(CH_3)_2$, diisobutylaluminum hydride, or sodium bis (2-methoxyethoxy)aluminum hydride.

In a thirteenth aspect, the disclosure provides the process of the eleventh or twelfth aspect, wherein the hydride reagent is $NaBH_4$.

In a fourteenth aspect, the disclosure provides the process of the process of any one of the eleventh through thirteenth aspects, wherein R and R¹ are hydrogen, methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, or sec-octyl.

In a fifteenth aspect, the disclosure provides the process of any one of the eleventh through fourteenth aspects, wherein R and R¹ are methyl.

In a sixteenth aspect, the disclosure provides the process of any one of the eleventh through fifteenth aspects, wherein the hydride reagent is $NaBH_4$.

In a seventeenth aspect, the disclosure provides the process of any one of the eleventh through the sixteenth aspects, wherein the dialkyl magnesium compound is $Mg(C_2$-$C_8$ alkyl$)_2$, $Mg(C_3$-$C_8$ alkyl$)_2$, or $Mg(C_4$-$C_8$ alkyl$)_2$.

In an eighteenth aspect, the disclosure provides the process of any one of the eleventh through the seventeenth aspects, wherein the dialkyl magnesium compound is $Mg(CH_2CH_2CH_2CH_3)_2$ or $Mg[(CH)(CH_3)(CH_2CH_3)][CH_2CH_2CH_2CH_3]$.

In a nineteenth aspect, the disclosure provides a process for preparing a compound of the Formula (II)

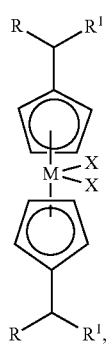
(II)

wherein M is chosen from Hf, Zr, Ti, Ta, Nb, W, and Mo;
wherein R and R¹ are independently chosen from hydrogen and $C_1$-$C_8$ alkyl;
which comprises contacting a compound of the formula

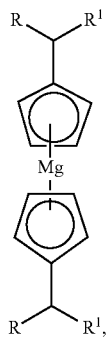

with a compound of the formula $MX_4$, wherein X is chloro, bromo, or iodo.

In a twentieth aspect, the disclosure provides the process of the nineteenth aspect, wherein M is Hf, Zr, Ti, W, or Mo.

In a twenty-first aspect, the disclosure provides the process of the nineteenth or twentieth aspect, wherein R and R¹ are hydrogen, methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, or sec-octyl.

In a twenty-second aspect, the disclosure provides the process of the nineteenth, twentieth, or twenty-first aspect, wherein R and R¹ are methyl.

In a twenty-third aspect, the disclosure provides a compound of the Formula (II):

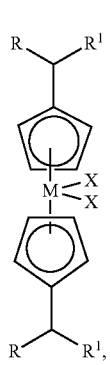

wherein M is Hf, Zr, Ti, Ta, Nb, W, or Mo; and X is chloro, bromo, or iodo; and
wherein the compound of Formula (III) has less than about 0.5 weight percent of multi-alkylated species, as determined by gas chromatography.

In a twenty-fourth aspect, the disclosure provides the compound of the twenty-third aspect, wherein M is Hf, Zr, Ti, W, or Mo.

In a twenty-fifth aspect, the disclosure provides the compound of the twenty-third or twenty-fourth aspect, wherein the compound of Formula (III) has less than about 0.3 weight percent or less than about 0.1 weight percent of multi-alkylated species.

In a twenty-sixth aspect, the disclosure provides the compound of the twenty-third, twenty-fourth, or twenty-fifth aspects, wherein the compound of Formula (III) is further devoid of dicyclopentadiene and mixed dicyclopentadiene species.

Having thus described several illustrative embodiments of the present disclosure, those of skill in the art will readily appreciate that yet other embodiments may be made and used within the scope of the claims hereto attached. Numerous advantages of the disclosure covered by this document have been set forth in the foregoing description. It will be understood, however, that this disclosure is, in many respects, only illustrative. The disclosure's scope is, of course, defined in the language in which the appended claims are expressed.

What is claimed is:

1. A process for preparing a compound of the Formula (I):

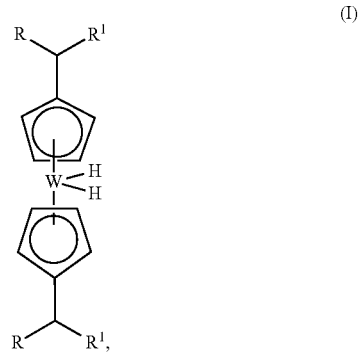

wherein R and R¹ are independently chosen from hydrogen and $C_1$-$C_8$ alkyl; the process comprising:
contacting a compound of the formula

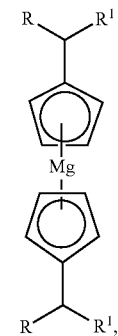

with $WCl_6$; and
adding a hydride reagent.

2. The process of claim 1, wherein the hydride reagent is $NaBH_4$, $LiAlH_4$, $LiBH_4$, $LiBH(CH_3CH_2)_3$, $[(isobutyl)_2AlBH_4]$, $NaBH_3CN$, $Na[HB(OC(O)CH_3)]$, $BH_3$-tetrahydrofuran, $BH_3$—$S(CH_3)_2$, diisobutylaluminum hydride, or sodium bis(2-methoxyethoxy)aluminium hydride.

3. The process of claim 1, wherein R and R¹ is hydrogen, methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, or sec-octyl.

4. The process of claim 1, wherein R and R¹ are methyl.

5. The process of claim 1, wherein the hydride reagent is $NaBH_4$.

6. The process of claim 1, wherein the hydride reagent is NaBH$_4$ and each of R and R$^1$ are methyl.

7. The process of claim 1, wherein the compound of Formula (I) has less than about 0.5 weight percent of multi-alkylated species.

8. The process of claim 1, wherein the compound of Formula (I) is devoid of dicyclopentadiene and mixed cyclopentadiene species.

9. A process for preparing a compound of the Formula (I):

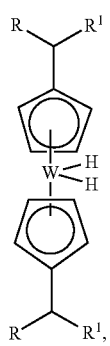
(I)

wherein R and R$^1$ are independently chosen from hydrogen and C$_1$-C$_8$ alkyl, the process comprising:

contacting a compound of the formula

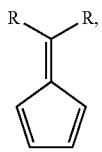

with a dialkyl magnesium compound to provide a compound of the formula

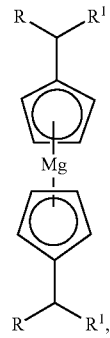

adding WCl$_6$; and
adding a hydride reagent.

10. The process of claim 9, wherein the hydride reagent is NaBH$_4$, LiAlH$_4$, LiBH$_4$, LiBH(CH$_3$CH$_2$)$_3$, [(isobutyl)$_2$AlBH$_4$], NaBH$_3$CN, Na[HB(OC(O)CH$_3$)], BH$_3$-tetrahydrofuran, BH$_3$—S(CH$_3$)$_2$, diisobutylaluminum hydride, or sodium bis(2-methoxyethoxy)aluminium hydride.

11. The process of claim 9, wherein the hydride reagent is NaBH$_4$.

12. The process of claim 9, wherein R and R$^1$ are hydrogen, methyl, ethyl, n-propyl, isopropyl, n-butyl, isobutyl, sec-butyl, n-pentyl, isopentyl, sec-pentyl, n-hexyl, isohexyl, sec-hexyl, n-heptyl, isoheptyl, sec-heptyl, n-octyl, isooctyl, or sec-octyl.

13. The process of claim 9, wherein R and R$^1$ are methyl.

14. The process of claim 9, wherein the hydride reagent is NaBH$_4$.

15. The process of claim 9, wherein the hydride reagent is NaBH$_4$ and each of R and R$^1$ are methyl.

16. The process of claim 9, wherein the dialkyl magnesium compound is a di(C$_1$-C$_8$ alkyl)magnesium compound.

17. The process of claim 9, wherein the dialkyl magnesium compound is Mg(CH$_2$CH$_2$CH$_2$CH$_3$)$_2$ or Mg[(CH)(CH$_3$)(CH$_2$CH$_3$)][CH$_2$CH$_2$CH$_2$CH$_3$].

* * * * *